(12) United States Patent
Smirnov

(10) Patent No.: US 7,188,075 B1
(45) Date of Patent: Mar. 6, 2007

(54) EXTENDED PRODUCT CONFIGURATION TECHNIQUES

(75) Inventor: Yuri Smirnov, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 487 days.

(21) Appl. No.: 09/608,356

(22) Filed: Jun. 29, 2000

(51) Int. Cl.
*G06Q 10/00* (2006.01)

(52) U.S. Cl. ........................................ 705/10

(58) Field of Classification Search ............... 705/10
See application file for complete search history.

(56) References Cited

U.S. PATENT DOCUMENTS

| | | | |
|---|---|---|---|
| 5,745,765 A | | 4/1998 | Paseman .................... 395/701 |
| 5,974,395 A | * | 10/1999 | Bellini et al. .................. 705/9 |
| 6,055,519 A | * | 4/2000 | Kennedy et al. .............. 705/80 |
| 6,141,653 A | * | 10/2000 | Conklin et al. ................ 705/80 |
| 6,167,383 A | * | 12/2000 | Henson ........................ 705/26 |
| 6,236,901 B1 | * | 5/2001 | Goss ............................ 700/95 |
| 2002/0010655 A1 | * | 1/2002 | Kjallstrom ................... 705/27 |

FOREIGN PATENT DOCUMENTS

| | | | |
|---|---|---|---|
| GB | 2302427 A | * | 1/1997 |
| JP | 2002324183 A | * | 11/2002 |
| WO | WO 00/17795 | * | 3/2000 |
| WO | WO 01/27796 A2 | * | 4/2001 |

OTHER PUBLICATIONS

Teresko et al., Calico Technology: Concinity configuration/quotation system, Industry Week, vol. 245, issue 23, Dec. 16, 1996, p. 24-26 [PROQUEST].*

Bruce, K., Can You Align IT with Business Strategy? Strategy & Leadership, vol. 26, No. 5, Nov./Dec. 1998, p. 16-21 [DIALOG: file 15].*

Dilger, Design by Desire, Manufacturing Systems, vol. 16, Issue 3, Mar. 1998, p. 62 [PROQUEST].*

Christopher, Logistics and Supply Chain Management, Strategies for Reducing Cost and Improving Service, 1998, Financial Times Professional Limited.*

Teresko et al.. Calico Technology : Concinity Configuration/Quotation System, Industry Week, vol. 245, Issue 23, Dec. 16, 1996 [PROQUEST].*

(Continued)

*Primary Examiner*—Tariq Hafiz
*Assistant Examiner*—Jonathan G. Sterrett
(74) *Attorney, Agent, or Firm*—Townsend and Townsend and Crew LLP

(57) ABSTRACT

Parameters of a re-configurable product include price and date when product will be available to a requesting party. Availability and or price parameters are integrated or extended into the configuration process of selecting product features to gain a higher level of customer service and satisfaction. The availability and or price parameters can be constrained, and can also be optimized with respect to other constraints. By defining a range of satisfaction that various parameters and product features can operate in, a customer can focus the configuration process on other parameters that are deemed critical. Optimizing focus parameters such as availability and or price with respect to all other parameters constitutes an extended product configuration technique. A dynamic BOM generated by this technique reflects all consumer dictated constraints, including any constraints on price and or availability.

32 Claims, 8 Drawing Sheets

OTHER PUBLICATIONS

Kalakota, Ravi, "Inter-Enterprise Fusion: The Future of Supply Chains", May 2000, eAI Journal, pp. 72-76.*

Hill, Sidney, Jr.; "How Fast is Your Business", Aug. 1999, Manufacturing Systems, 17, 8, ABI/INFORM Global. pp. i.-vi.*

Orr, Alicia, "On Track at Club-Mac", May 1999, Target Marketing, v22n5, pp. 82-83, Dialog 01831477 04-82468.*

Olenick, Doug, "Compaq Configurator Is So Clear, Even a Novice Can—Online BTO Operation Works", Nov. 16, 1998, Computer Retail Week, p. 57(1). Dialog 05955951 53223439.*

Rosenberg, Jerry M; "Dictionary of Computers, Information Processing & Telecommunications", John Wiley & Sons, 1987, p. 516.*

Bourke, Richard; Kempfer, Lisa; "Achieving Success with Mass Customization: The vital contribution of Engineering", Oct. 1999, Computer-aided Engineering, v18n10, pp. 42-52, Dialog 01908399 05-59391.*

Marion, Larry; Kay, Emily; "Customer of One: The next market paradigm", Nov. 1997, Software magazine, 17, 13, ABI/INFORM Global, p. 38.*

Scott-Walton, Barry; "The Dynamic Assembly Line", May 15, 2000, Intelligent Enterprise, 3, 8, 10, Dialog 02415931 62791392.*

Fliedner, Gene; Vokurka, Robert J; "Agility: Competitive Weapon of the 1990s and Beyond?", 3rd Qtr 1997, Production and Inventory Management, 38, 3, ABI/INFORM Global, p. 19.*

Anonymous, "Changing the Retail Game Through Guided Selling", Mar. 1999, whitepaper from Calicotech.com, pp. 1-10, Article retrieved from www.crm2day.com/library/docs/wp0010.pdf.*

Fong, Kevin; "Preparing your network for electronic commerce", Oct. 6, 1997, . Network World, Framingham:. vol. 14, Iss. 40; p. 68 (1 page). ProQuest ID 16959477.*

Frook, John Evan; "Linking The Supply Chain With The Cash Register", Apr. 6, 1998, InternetWeek. Manhasset:. p. PGS.07, ProQuest ID 10969969.*

Wilder, Clinton; "Strictly business", Mar. 17, 1997, InformationWeek. Manhasset:. p. 38 (6 pages), ProQuest ID 11386692.*

King, Nelson, "Four commerce packages and the trends they show", Mar. 8, 1999, InternetWorld, IW.com webpage from web.archive. org, pp. 1-2.*

BusinessWire, "Aurum to deliver on best-of-breed partnership strategy for sales force automation solution; leading technology providers team with Aurum to offer", Apr. 18, 1995, pp. 1-4.*

Hewitt, Fred; "Demand satisfaction communities: New operational relationships in the information age", 2000, International Journal of Logistics Management, Ponte Vedra Beach:. vol. 11, Iss. 2; p. 9 (12 pages).*

Kakabadse Nada, Kakabadse, Andrew; "Critical review—outsourcing: A paradigm shift", 2000, The Journal of Management Development. Bradford:. vol. 19, Iss. 8; p. 670 (59 pages).*

Karpinski, Richard; "Supply Chain—Think A Chain Of Efficiencies", Oct. 25, 1999, InternetWeek. Manhasset:. p. PG.73.*

Ravi Kalakota, Ralph A Oliva, Bob Donath, "Move over, e-commerce", Fall 1999, Marketing Management. Chicago:. vol. 8, Iss. 3; p. 22 (11 pages).*

Steve Jeffrey, "The power of B2B E-commerce", Sep. 1999, Strategic Finance. Montvale:. vol. 81, Iss. 3; p. 22 (5 pages).*

Philip Siekman, "Where 'build to order' works best" Apr. 26, 1999, Fortune. New York: vol. 139, Iss. 8; p. 160C (9 pages).*

Michael A Verespej, "Michael Dell's magic", Nov. 16, 1998, Industry Week. Cleveland:. vol. 247, Iss. 21; p. 57 (5 pages).*

Anonymous, "Interview: Ecommerce drives Dell Computer's Success", Jun. 1999, IT Cost Management Strategies, Carlsbad, vol. 18, Iss. 6, p. 4, 3 pgs. ProQuest ID 42374056.*

Cross, Gary J; "How e-business Is transforming supply chain management", Mar./Apr. 2000, The Journal of Business Strategy, Boston, vol. 21, Iss. 2, p. 36, 4 pgs, ProQuest ID 50834878.*

Briody, Dan; "Dell follows industry standards, but its direct-sales model leads", Aug. 25, 1997, InfoWorld, vol. 19, Iss. 34, p. 29, 2 pgs, ProQuest ID 13646961.*

"Calico—provider of e-commerce software and services", Apr. 23, 1999, calicotech.com, webpage from web.archive.org, p. 1, web.archive.org/web/19990423194523/www.calicotech.com/index2. html.*

Anonymous, "Cisco Systems—A global networked commerce case study", copyright © 1997 Sun® Microsystems, pp. 1-5, article retrieved from http://www.nadelphelan.com/pdfs/Cisco2.pdf.*

Tuteja, *Enterprise Resource Planning: What's There In It!* [online], [retrived on Mar. 3, 2000]. Retrieved from the Internet <URL: http://www.geocities.com/CollegePark/Library/6045/erp.html>.

* cited by examiner

EXTENDED PRODUCT CONFIGURATION TECHNIQUES

BACKGROUND OF THE INVENTION

1. Field of the Invention

The present invention relates to techniques for configuring a product that has selectable features, and more particularly, to dynamically providing the real-time price and or availability of those selectable features throughout the configuration process.

2. Description of the Related Art

Within eCommerce systems (i.e., conducting business on-line over the Internet), the questions of deciding what products to purchase may depend upon several factors. Depending on the eCommerce customer, certain factors will be more important than other factors. Some of these factors, for example, include the variety of selectable product features, the functionality of product features, and the price and the availability of the product with selected features. Each of the above-mentioned factors, among others, can play a critical role in the purchasing decision of a customer. Thus, the configuration of a multi-feature product involves at least three different processes: (1) the actual selection of the various product features; (2) establishing a price for each of the selected features, as well as the overall price of the multi-feature product; and (3) the availability of each of the selected features, as well as the overall availability of the multi-feature product.

Conventional configuration techniques typically involve performing the selection, pricing and the availability processes separately and independent from one another. As a result, availability information (and sometimes pricing information) is determined only after the multi-feature product has been completely configured. The problem with this technique is that both price and availability of various product features may influence what product features are actually selected. This problem is further exacerbated by the disconnect that historically exists between a customer who is purchasing a configurable product and the entity that will actually make the product—the manufacturer. Also, the vendors that supply raw materials to the manufacturer are even further disconnected from the customer. Techniques involving supply chain planning (SCP) and enterprise resource planning (ERP) attempt to integrate the sellers and customers with the manufacturing environment, but such techniques are based on the presumption that a bill of materials that fully defines the configurable product has already been generated. As such, the disconnect between customers and the manufacturing environment has not been bridged by these techniques.

For instance, an eCommerce customer can select all the features of a configurable product through a web-enable configuration application at the web site of the product seller. Once the seller has the customer's order or bill of materials (BOM), the seller presents that BOM to the manufacturer of the product. The manufacturer must evaluate the BOM in order to determine a number of things including what resources are needed to make the product. Pursuant to conventional manufacturing resource planning techniques, such resources can be broken down into two categories: (1) consumable resources, such as goods, sub-assemblies and other materials; and (2) re-usable resources, such as machines, employees and other non-depletable items.

Consumable resources may either be stocked in inventory, or may be supplied by an outside vendor once a product comprised of those materials is ordered (i.e., a BOM is received by the manufacturer). Other considerations the manufacturer must take into account with regards to such consumable resources include how many previous orders have priority over the order just received, how long the inventory will sustain the current order base, and how long it will take a vendor to supply the materials that are not maintained in inventory, just to name a few. Additionally, unpredictable events that affect supply chains (e.g., natural disasters adversely affecting raw materials and the people that produce those materials, or common carrier labor strikes) can be considered. Factors such as these all play a significant role in a manufacturer's ability to give an accurate price and delivery date to the customer placing the order, whether that customer be, for example, an individual consumer (end-user) or a seller.

Re-usable resources are typically resources the manufacturer has in-house. However, considerations such as machine down-time (e.g., because of preventative maintenance or repair), employee absences (e.g., because of vacations and sick days), internal labor strikes, and computer-related failures (e.g., such as a crashed network or database) also impact the manufacturer's ability to give an accurate price and delivery date to the entity placing the order.

Based on all such considerations relevant to the consumable and re-usable resources, a manufacturer provides to the seller a price and availability quote estimating when the ordered product will be ready. The supplier can then give a price and availability quote to the customer. Typically, supply-oriented companies (e.g., the seller) are able to provide the pricing component of the configuration process without any further information from the manufacturer, but such companies typically neglect the availability component of the configuration process. On the other hand, manufacturing-oriented companies may provide the availability component within eCommerce applications, but have failed to provide the selection and pricing components. Thus, the consumer's purchasing decision is typically constrained by a lack of knowledge regarding optimal terms relevant to pricing and/or availability.

More specifically, the customer may or may not be satisfied with the quoted terms. For example, the customer may have been willing to pay more for an earlier availability date, or willing to take a later availability date for a lower price. For the purpose of customer satisfaction, therefore, the processes of pricing product features and determining the availability of the product with those features should be considered during the process of selecting individual product features rather than after the entire product is configured. Current product configuration techniques that provide price and availability information only after the consumer has generated a BOM are inadequate and fail to satisfy important customer needs.

Therefore, what is needed is an extended product configuration technique that gives customers access to price and availability information during the process of configuring a multi-feature product. Additionally, the customer should be able to constrain the configuration process based on the desired price and or availability dates of individual product features. Likewise, the customer should be able to constrain the configuration process based on the overall price and or availability date of a configured product. The BOM generated by this extended product configuration technique should reflect all consumer dictated constraints, including constraints on price and or availability.

BRIEF SUMMARY OF THE INVENTION

The described extended product configuration techniques give users (e.g., customers) access to availability and or price information during the process of configuring a multi-feature product. For example, the availability calculation for a re-configurable product is extended into the configuration process. Additionally, the customer is able to constrain the configuration process based on the desired price and or availability dates, whether such constraints are applied to individual product features, or to the overall price and or availability date of a configured product. A BOM that reflects all consumer dictated constraints, including any constraints on price and or availability is generated.

Configurable features or parameters of a multi-feature product include a price of that feature and a date when that feature is expected to become available to a requesting party. Both the availability and price parameters fall within the boundaries of an eCommerce agreement between a customer and an eCommerce business. These parameters are dynamically integrated into the process of selecting product features to gain a higher level of customer service and satisfaction. The availability and price parameters can be constrained. As such, the BOM generated reflects not only the specific features selected by the customer, but can also reflect the customer's desired price and availability date.

The present invention allows for greater flexibility in the relationship between consumers, product sellers and manufacturers. Each of these parties stands to benefit from the present invention. For instance, the customer is allowed to specify in advance limitations and constraints on parameters considered critical to the customer, while also allowing the customer to specify in advance that other parameters are less critical. Similarly, a seller or manufacturer can extract a higher price for a requested earlier availability date. This prioritizing of product features and parameters allows the needs of the respective parties to be identified so that the chance of a sale that is satisfactory to all parties is optimized. Each of the parties critical needs can be distinguished from their mere desires.

For example, if the customer can purchase a configured product by a certain date and at a certain price, then she may be willing to accept any number of available product colors even though she prefers the color red which is unavailable in the time period specified by her (e.g., because a flood wiped out the berry crop that is used to make that particular color red). On the other hand, if the manufacturer cannot provide a configured product on the date specified by the customer (e.g., because of a worker shortage), then perhaps the customer would be willing to pay more for that configured product in order to receive it on the specified date (the added cost being needed to offset the worker shortage). Thus, the present invention takes into account real life issues that exist in the world of commerce. Other factors that affect the price and availability date of a product can likewise be considered.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
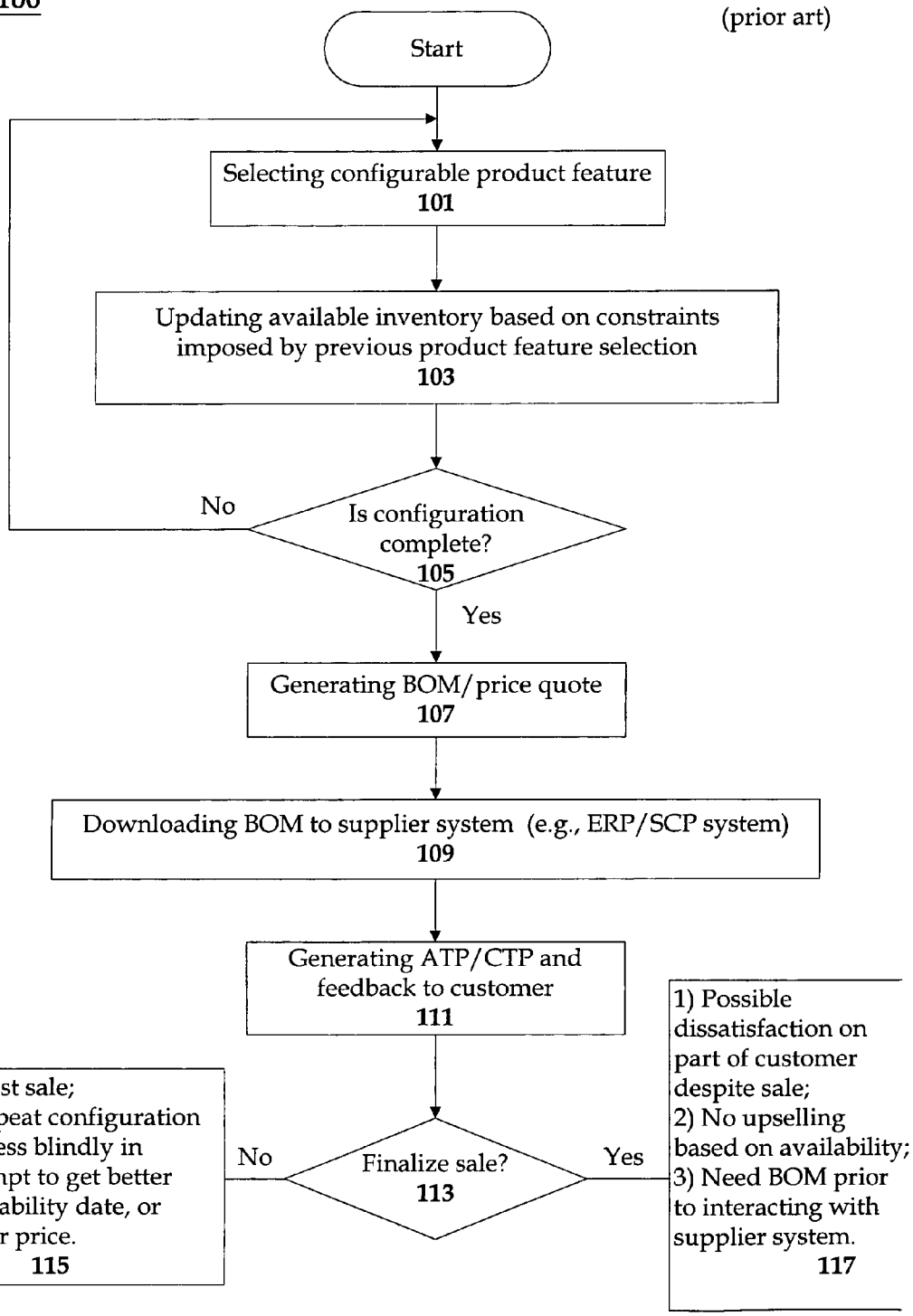
FIG. 1 is a flowchart of a conventional product configuration technique.

FIG. 1 is a flowchart of a conventional product configuration technique. The process 100 typically begins with the customer selecting 101 a feature of a configurable product. For example, a customer configuring a computer that they intend to purchase could be selecting the type of central processing unit (CPU) desired. After a feature is selected, any constraints associated with that feature are incorporated into the product configuration process. For instance, the customer's user interface may indicate that certain hard drives are incompatible with the CPU selected. Thus, each time a feature is selected by a customer, process 100 proceeds by updating 103 the available remaining features based on constraints imposed by that selection. For example, if a feature selected is a CPU that requires at least 32 Mbytes of random access memory (RAM), then RAM configurations lower than 32 Mbytes are removed from the list of available inventory displayed to the user. A determination 105 is then made as to whether the configuration is complete. If not, then steps 101, 103 and 105 are repeated until the determination 105 results in an affirmative. U.S. Pat. No. 5,745,765 to Paseman, which is herein incorporated by reference, describes an example of one type of product configuration technique.

Once the configuration process is complete, process 100 continues by generating 107 a BOM that contains a description of the product as configured by the customer. Then, process 100 continues by downloading 109 the BOM to the supplier system (e.g., a ERP/SCP system or other resource planning system). The BOM is then evaluated at the supplier system in order to determine the availability date of the configured product. The supplier system responds by generating 111 an availability date (e.g., available-to-promise (ATP) or capable-to-promise (CTP) quote), and that date is fed back to the customer. Once the supplier system provides an ATP or CTP quote, a determination 113 is made as to whether the quote is acceptable to the customer. If not, then the customer can be given an opportunity to change the configuration or sales parameters, or simply to not buy the product, as indicated in step 115.

If the quote is acceptable, then the sale is finalized. However, as indicated by step 117, there is a possibility that, despite the sale, the customer has an unacceptable level of dissatisfaction. In such a case, the customer may vocalize such dissatisfaction to other potential consumers who will now avoid doing business with the seller. Furthermore, it is likely that the customer will no longer do business with the seller. Thus, such configuration systems give rise to a loss of both customer referrals and repeat business, two cornerstones of any successful business. Additionally, this conventional system does not allow upselling based on availability. In short, the sale is a take-it or leave-it proposition with no dynamic interaction between the consumer and the seller. The only interaction between the customer and the supplier system is a static BOM.

Figure 2:
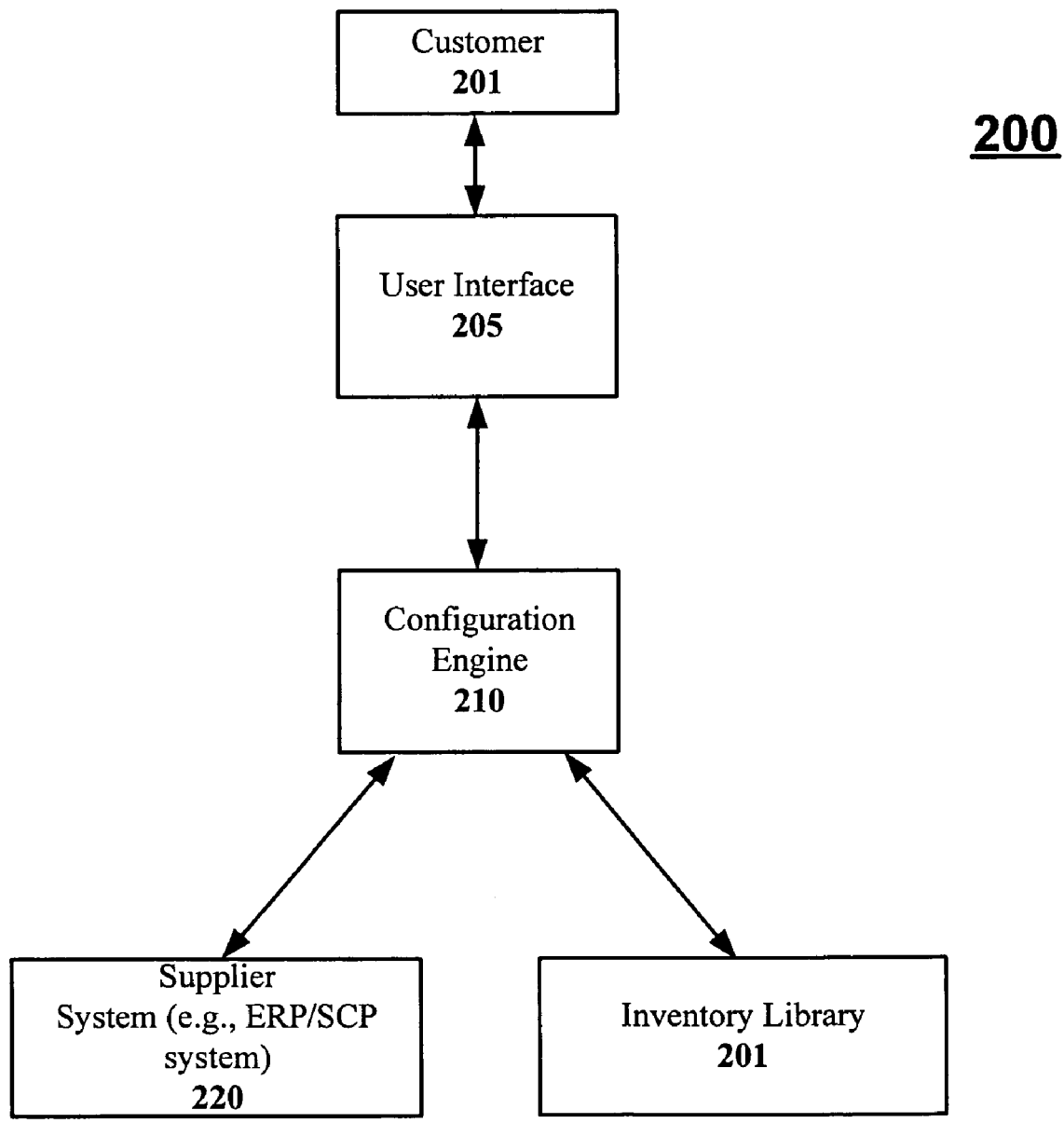
FIG. 2 is a block diagram of a product configuration system in accordance with one embodiment of the present invention.

FIG. 2 is a block diagram of a product configuration system in accordance with one embodiment of the present invention. Configuration system 200 is comprised of a user interface (UI) 205, a configuration engine 210, a supplier system 220 (e.g., a ERP/SCP system or other resource planning system), and an inventory library 230. Each of the components comprising system 200 can be implemented in hardware, software, firmware or any combination thereof.

UI 205 is operatively coupled to configuration engine 210, and provides a graphic interface between a customer and 201 system 200. UI 205 allows the customer 201 to easily and effectively relate her desired product configuration to the configuration system without requiring any great deal of thought or understanding on the customer's part as to how the configuration system actually operates. Graphical user interfaces are well known in the art and can be implemented in a number of ways to ease a user's (e.g., a customer 201) experience in interacting with a complex system.

Configuration engine 210 receives the customer's input from UI 205, and is further coupled to inventory library 230 and to supplier system 220. Inventory library 230 provides configuration engine 210 with a library or catalog of selectable features that correspond to a particular configurable product. The inventory library 230 may also contain the constraints associated with each selectable feature. This library of selectable features can be presented to UI 205 via configuration engine 210. Thus, the customer 201 can have access to all the selectable features of the desired product.

As the various product features are selected, inventory library 230 is updated to reflect all constraints imposed by those selections. As such, UI 205 can reflect all constraints as well. As a result, the customer 201 can be prevented from making a selection that would cause a violation (e.g., selecting two product features that are not compatible with one another). Alternatively, the customer 201 can be allowed to select a feature that causes a violation, but the impact of the violation is made apparent to the customer 201. For example, all selected product features that are affected by the violation can be highlighted (for example, within UI 205) so that they stand out from other selected features. By showing all the features that are involved in the violation, customer 201 can be guided to alternate choices of features that both remedy the violation and are satisfactory to the customer 201. U.S. Pat. No. 5,745,765 to Paseman discloses a configuration system that implements such concepts.

Once configuration engine 210 receives the customer's 201 selection from UI 205, that selection is provided to supplier system 220, which in turn provides configuration engine 210 with availability information (e.g., an ATP or CTP quote) for that selection. Supplier system 220 can also provide configuration engine 210 with price information. Configuration engine 210 can then determine if the availability date and price provided satisfy the customer's desires. If the customer is not satisfied, then the configuration engine 210 can communicate the customer's specific desires to supplier system 220 to determine if those desires can be accommodated. Supplier system 220 may then provide configuration engine 210 with accommodation data that can then be forwarded to the customer 201 via UI 205.

In one embodiment, UI 205 (e.g., running as an application on a customer's 201 computer), configuration engine 210 and supplier system 220 are all remotely located with respect to each other. The coupling between such remote blocks is provided by a conventional on-line connection (e.g., an integrated services digital network line, a digital subscriber line, a T1 line, a cable line, or other known on-line connection-types). In an alternative embodiment, configuration engine 210 can be locally located with respect to UI 205, or with respect to supplier system 220. Likewise, UI 205 can be local to supplier system 220, and remote to configuration engine 210. The coupling between the local blocks can be provided by a conventional hardwire connection, or alternatively, by a conventional wireless connection. Inventory library 230 is typically local to configuration engine 210, and the coupling between the two is conventional. However, inventory library 230 may also be remote from configuration engine 210. Those skilled in the art will recognize various other configurations that may arise depending on the nature of the business involved and the relationship between the parties involved (e.g., consumer, retailer, wholesaler, manufacturer, distributor, or vendor to manufacturer).

Figure 3A:
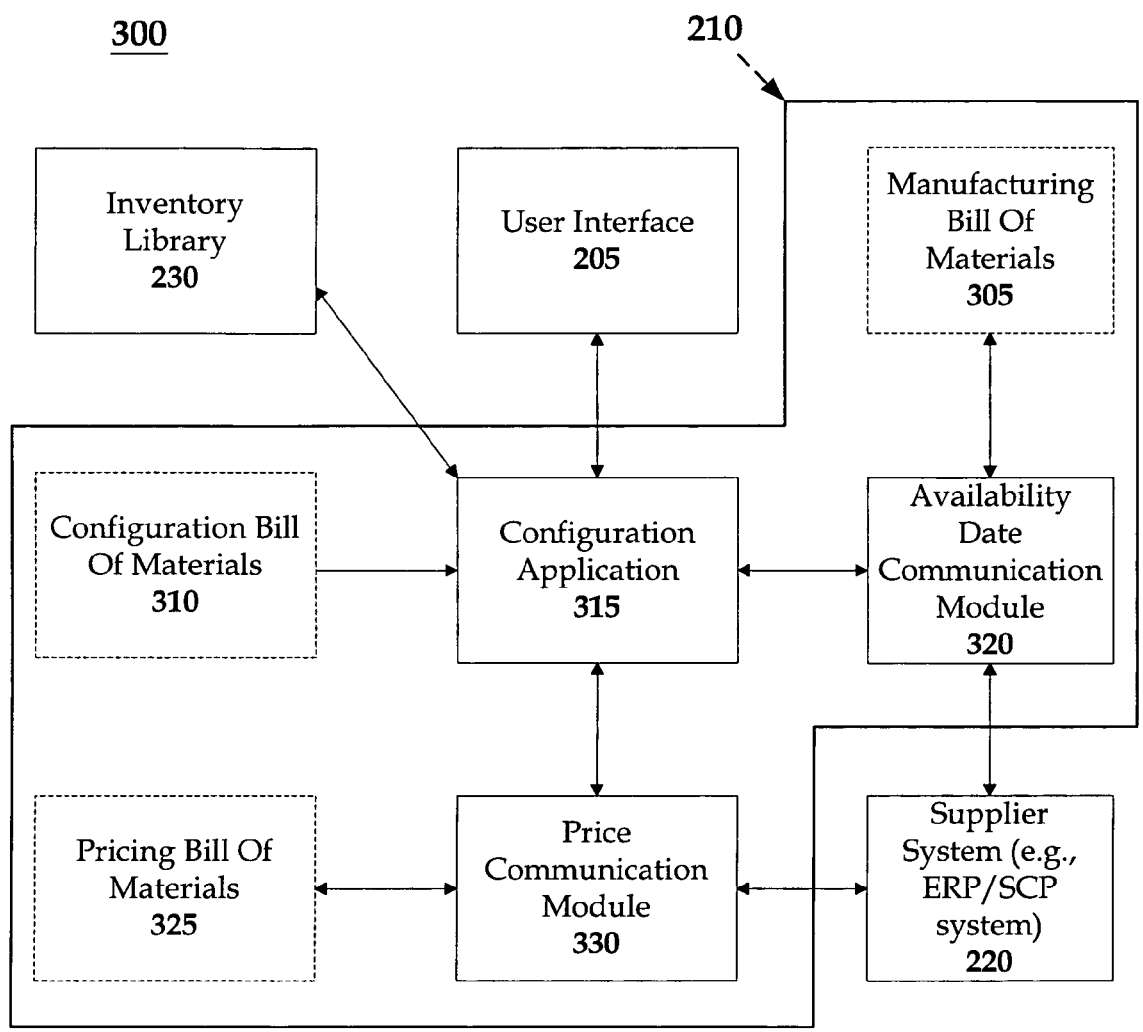
FIG. 3a is a block diagram of a product configuration system in accordance with one embodiment of the present invention.

FIG. 3a is a block diagram of a product configuration system in accordance with one embodiment of the present invention. System 300 is comprised of inventory library 230, supplier system 220, UI 205 and configuration engine 210. In this embodiment, configuration engine 210 is comprised of a configuration application 315, a price communication module 330, and an availability communication module 320. Each of the components comprising configuration engine 210 can be implemented in hardware, software, firmware or any combination thereof. Additionally, although each component of configuration engine 210 is shown as a separate block, one skilled in the art will appreciate that configuration engine 210, or any combination of its components, can be implemented in a single discreet chip, board or system.

During a product configuration, configuration engine 210 develops and uses a configuration BOM 310, a manufacturing BOM 305, and a price BOM 325, which, according to one embodiment, are in the form of data files. In general, the configuration BOM 310 is a hierarchy of inventory items that have been selected by the customer. With respect to the manufacturing BOM 305, which is derived from the configuration BOM 310, the items selected by the user are broken down or combined into manufacturable units, and the manufacturing BOM 305 is a hierarchy of these manufacturable units. Each manufacturable unit in the manufacturing BOM 305 is associated with a date by which the unit can be available. With respect to the price BOM 325, which can be derived from either the configuration BOM 310 or the manufacturing BOM 305, the items selected by the user or the item to be manufactured are broken down or combined into priceable units, and the pricing BOM 325 is a hierarchy of these priceable units. Each priceable unit in price BOM 325 is associated with a price. The configuration BOM 310, the manufacturing BOM 305, and the price BOM 325 are described in more detail below.

Configuration application 315 is coupled to inventory library 230 thereby providing the user access (via UI 205) to a set of product features and their corresponding constraints. Once configuration application 315 receives an input from UI 205 (e.g., a product feature is selected), that feature is added to configuration BOM 310. As previously stated, configuration BOM 310 is a hierarchy of inventory items that have been selected by the user. Each time a feature is selected, it is indicated in a corresponding hierarchal position in configuration BOM 310. Configuration BOM 310 will be discussed in more detail with reference to FIG. 5.

Availability communication module 320 is coupled to configuration application 315. Once a product feature is selected and received by configuration application 315, availability communication module 320 contacts supplier system 220 to determine the earliest availability date for that feature. Manufacturing BOM 305, which is derived from configuration BOM 310, is updated with the availability information received from supplier system 220 with respect to that feature. In one embodiment, each feature represented in the configuration BOM 310 maps to a corresponding hierarchal position in the manufacturing BOM 305. This corresponding position can be used to indicate the real-time availability information of the corresponding selected feature. The mapping between the configuration BOM 310 and the manufacturing BOM 305 may be one-to-one, or one-to-many, or many-to-one, or many-to-many. Each of these mappings will be explained in more detail with reference to FIG. 6.

Price communication module 330 is also coupled to configuration application 315. Once a product feature is selected and received by configuration application 315, price communication module 330 can contact supplier system 220 to determine the price of that feature. Pricing BOM 325, which can be derived from configuration BOM 310 or from manufacturing BOM 305, is updated with the pricing information received from supplier system 220 with respect to that feature. In one embodiment, where pricing is determined by supplier system 220 (e.g., on the resource planning side or the manufacturing side), pricing BOM 325 is derived from manufacturing BOM 305. In this case, each feature represented in configuration BOM 310 maps to a corresponding hierarchal position in the pricing BOM 325 (although, as will be discussed below, there is not necessarily a one-to-one mapping). Alternatively, in an embodiment where pricing is determined by the seller (e.g., on the configuration side), pricing BOM 325 is derived from configuration BOM 310. In this case, each availability date represented in manufacturing BOM 305 maps to a corresponding hierarchal position in the pricing BOM 325.

Depending on the source that the pricing BOM 325 is converted from, a position in the pricing BOM can be used to indicate the real-time price information of the corresponding selected feature (when converted from the configuration BOM 310), or to indicate the real-time price information of the corresponding availability date (when converted from the manufacturing BOM 305). The mapping between the configuration BOM 310 (or the manufacturing BOM 305) and the pricing BOM 325 may be one-to-one, or one-to-many, or many-to-one, or many-to-many. Each of these mappings will be explained in more detail with reference to FIG. 7.

In the event that the user is not satisfied with the availability date or the price of a feature, the user can communicate that dissatisfaction to configuration application 315 via UI 205. For example, the user can communicate a desired or more satisfactory price and or availability date to configuration application 315. Availability communication module 320 can then communicate the desired date to supplier system 220. Likewise, price communication module 330 can communicate the desired price to supplier system 220. At this point, supplier system 220 may provide a different date or a different price based on the customer's need. Such accommodation data can be used to salvage an otherwise failed sale.

For example, the manufacturer of the product may be able to provide an earlier availability date for a selected feature if the user is willing to pay a higher price. Allowing for upselling based on availability provides an alternate sales solution to both the user and the manufacturer. Similarly, the seller of the product may be able to provide a lower price for a selected feature if the user is willing to accept a later availability date. Other creative solutions can be implemented as well depending on the particular players involved and their respective needs with respect to price, availability and product configuration.

Variations on system 300 can be implemented as well in light of the teachings herein. For example, configuration application 315 may also be coupled to the manufacturing bill of materials, and to the pricing bill of materials. Additionally, the inventory library 230 may be coupled to the configuration bill of materials 310. Likewise, the inventory library 230 may be coupled to the UI interface 205. These couplings, as well as other possible couplings depend on the desired system performance, and can be implemented accordingly. Furthermore, each of the configuration BOM 310, the manufacturing BOM 305 and the pricing BOM 325 can be implemented in a storage device or memory such as RAM, or in a data file, or in a data structure, or in a linked list of data structures. Other known means for implementing data storage are also intended to be covered by this disclosure. Also, the functionality of the availability communication module 320, the price communication module 330 and the configuration application can be implemented, for example, in a software module (or modules). Such software modules can be embedded in a microcontroller, or reside in a computer readable medium. The examples indicated herein are not intended as an exhaustive list.

Figure 3B:
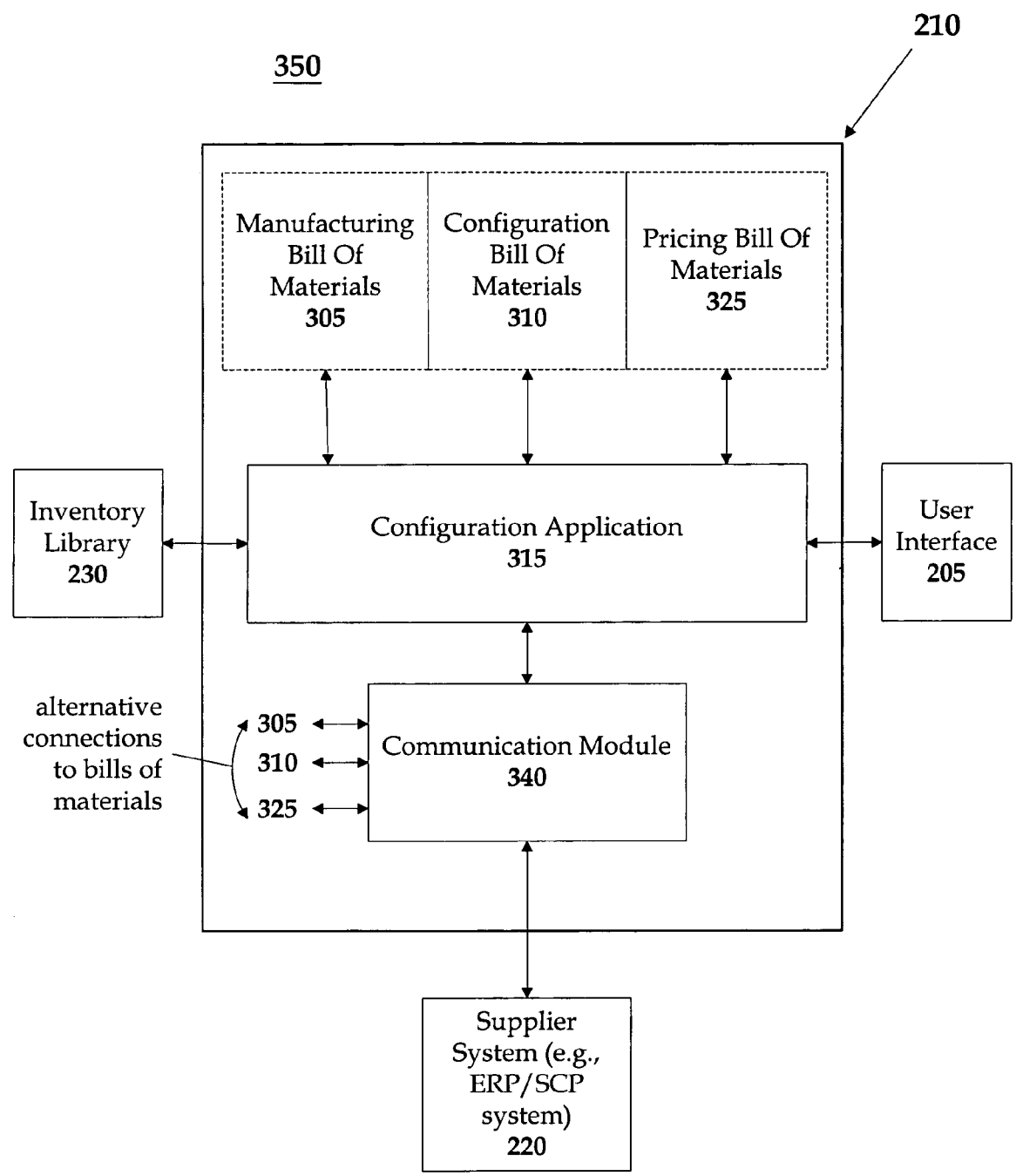
FIG. 3b is a block diagram of a configuration engine in accordance with one embodiment of the present invention.

FIG. 3b is a block diagram of a configuration engine in accordance with another embodiment of the present invention. Configuration system 350 is comprised of inventory library 230, supplier system 220, UI 205 and configuration engine 210. In this embodiment, configuration engine 210 is comprised of configuration application 315, configuration BOM 310, manufacturing BOM 305, pricing BOM 325, and a communication module 340. Each of the components comprising configuration engine 210 can be implemented in hardware, software, firmware or any combination thereof. Additionally, although each component of configuration engine 210 is shown as a separate block, one skilled in the art will appreciate that configuration engine 210, or any combination of its components, can be implemented in a single discreet chip, board or system.

In this embodiment, configuration BOM 310, manufacturing BOM 305, and pricing BOM 325 are implemented in the same memory device. For example, the memory device can be a conventional hard drive (whether it be fixed or removable), a diskette in a disk drive, a compact disk in a compact disk drive, a random access memory chip or bank of such chips, or other equivalent storage devices. Each bill of materials can exist in its own partition or address space of the memory device. Alternatively, configuration BOM 310, manufacturing BOM 305, and pricing BOM 325 are implemented in different memory devices. Those skilled in the art will recognize that each of these bills of materials can be stored in a number of conventional ways, and all such ways are intended to be covered by this disclosure.

Configuration BOM 310, manufacturing BOM 305, and pricing BOM 325 are each configured to be accessible by the configuration application 315. Additionally, configuration BOM 310, manufacturing BOM 305, and pricing BOM 325 may each be configured to be accessible by the communication module 340 as well as shown by the alternative connections.

Communication module 340 is configured to send and receive input from the configuration application 315, and is also configured to send and receive input from the supplier system 220. For example, communication module 340 can communicate a product feature selected by the customer (not shown) to the supplier system 220. Additionally, communication module 340 can communicate an accommodation provided by the supplier system 220 to the customer. For instance, the customer may have requested an earlier availability date for a particular product feature that was selected. The supplier system might accommodate that request of an earlier availability date, but only at an increased cost to the customer. In this case, the customer specified availability date, along with the increased cost, would be communicated from the supplier system 220 to the customer by the communication module 340.

In one embodiment, this accommodation (e.g., in the form of the requested availability date and an increased price) is received by the configuration application 315. The configuration application 315 can then update the configuration BOM 310 with the received availability date, and the pricing BOM 325 with the received price. Alternatively, this accommodation (e.g., in the form of the requested availability date and an increased price) is received directly by the configuration BOM 310 (which is updated with the received availability date) and the pricing BOM 325 (which is updated with the received price). Either way, the customer can view the accommodation via the UI 205.

Communication module 340 can be implemented in hardware, software, firmware, or any combination thereof. In one embodiment, communication module 340 is comprised of a price communication module and an availability date communication module that function independently of each other in response to the configuration application 315 and or the supplier system 220. Alternatively, communication module 340 is comprised of one module that communicates both price and availability date information between the customer and the supplier system 220. Other embodiments will be apparent in light of this disclosure, and such embodiments are intended to be covered by this disclosure.

Figure 4:
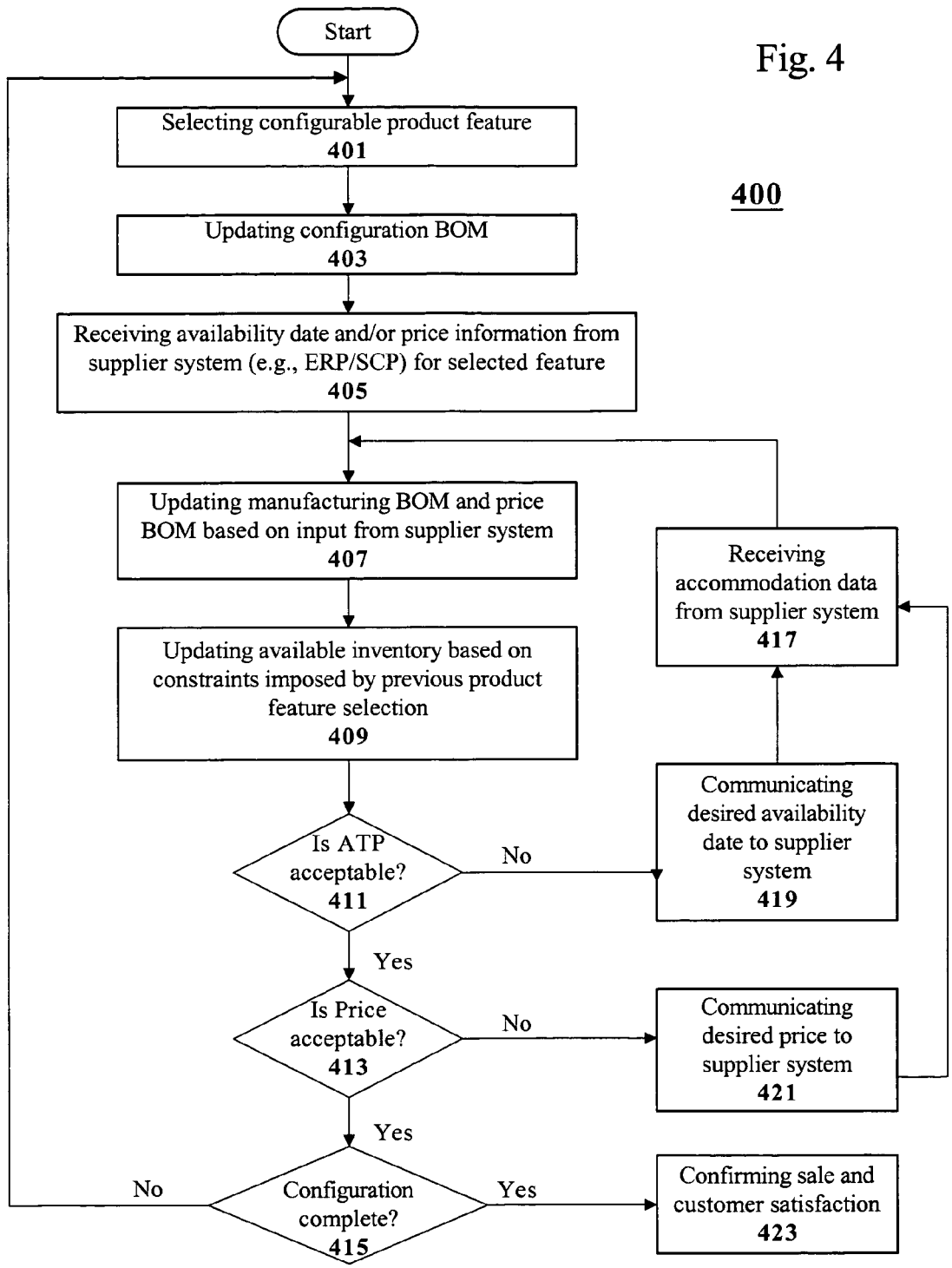
FIG. 4 is a flowchart illustrating a method for configuring a product in accordance with one embodiment of the present invention.

FIG. 4 is a flowchart illustrating a method for configuring a product in accordance with one embodiment of the present invention. The process 400 begins with a user selecting 401 a feature of a configurable product. The next step includes updating 403 the configuration BOM 310 with the selected feature, and may further comprise validating the constraints associated with that feature. Process 400 further includes receiving 405 from the supplier system 220 the availability and or price information associated with that selected feature. Availability information may be in the form of, for example, an ATP or CTP quote. Pricing information may be in the form of, for example, a manufacturer's suggested retail price or a wholesale price. Once the availability and price information are received, process 400 proceeds with updating 407 the manufacturing BOM 305 and the pricing BOM 325. Each of BOM 305, 310 and 325 can be referred to as being in-process while the configuration is in process. Once the customer has finished configuring the product, then each respective BOM can be referred to as being completed as opposed to being in-process. Additionally, process 400 includes updating 409 the available inventory based on the constraints imposed by the selected product feature.

A determination 411 is made as to whether the availability date is acceptable to the user. If not, process 400 proceeds with communicating 419 the desired date (e.g., a customer specified availability date) to the supplier system 220. The supplier system 220 may then provide accommodation data (e.g., an earlier date and or a different price based on the customer's need). In this case, process 400 includes receiving 417 accommodation data from the supplier system 220, and step 407 is repeated and the user has the opportunity to accept or reject the accommodation offered by the supplier system 220. If the availability date is acceptable, then a further determination 413 can be made as to whether the price of the selected feature is acceptable. If not, process 400 proceeds with communicating 421 the desired price (e.g., a customer specified price) to the supplier system 220. The supplier system 220 may then provide accommodation data (e.g., a lower price combined with a later availability date based on the customer's specified price). In this case, process 400 includes receiving 417 accommodation data from the supplier system 220, and step 407 is repeated and the user has the opportunity to accept or reject the accommodation offered by the supplier system 220.

If the price for that feature is acceptable, then a further determination 415 is made as to whether the configuration is complete. If not, then the user is given the opportunity to continue the configuration process by selecting 401 another feature of the configurable product. If the configuration is complete, however, then process 400 proceeds by confirming 423 the sale and customer satisfaction. Variations on this method can be implemented. For example, the steps may be performed in many different orders to achieve the same results. Additionally, the configuration system may also provide a real-time total price indicator that is updated as the user makes various selections. Likewise, the system may maintain a real-time overall availability date indicator that is updated as the user makes various selections. Such indicators would reflect the total price based on the product configuration so far, and the earliest date the product is available.

Figure 5:
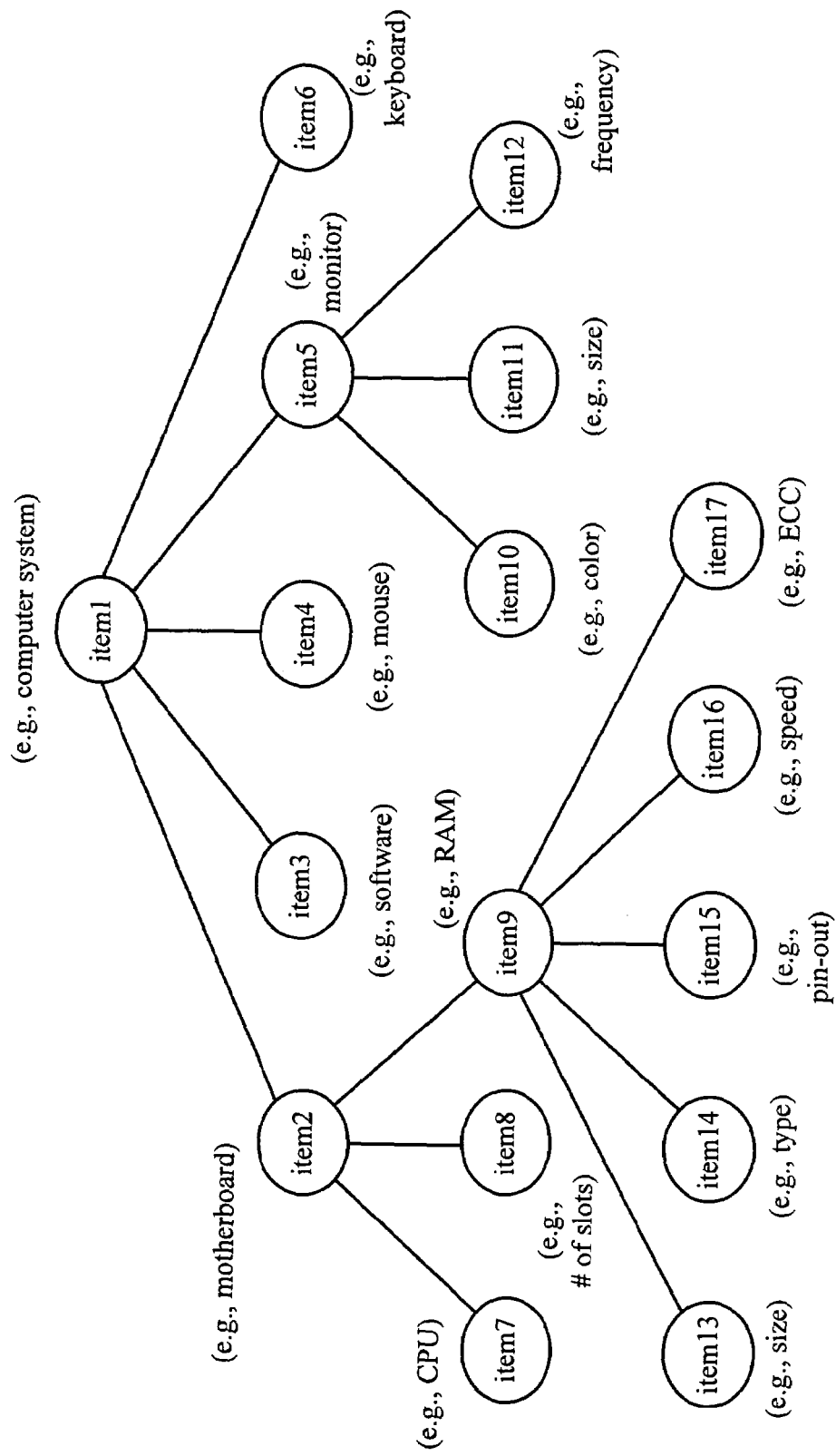
FIG. 5 represents a configuration BOM in accordance with one embodiment of the present invention.

FIG. 5 represents a configuration BOM in accordance with one embodiment of the present invention. Item 1 represents the first level of the structure's hierarchy. For example, item 1 might indicate a Hewlett-Packard™ computer system is the product being configured. The user may have selected such a system over other computer system types offered, or it may be the only system offered by this particular seller. Those skilled in the art will recognize that item 1 can be any configurable product, whether it be a simple product with only one or two configurable features such as a shirt (e.g., size and color), or a complicated product with many configurable features such as a car (e.g., body style, color, engine size, interior, sound system, power options, air conditioning, etc). Items 2 through 6 represent the second level of the hierarchy.

Each of the items indicated in this second level of the hierarchy represents configurable features of item 1. For example, continuing with the computer system example, item 2 represents the motherboard of the system, item 3 represents the software package that comes with the system, item 4 represents the mouse, item 5 represents the monitor and item 6 represents the keyboard. In this example, items 3, 4 and 6 are not configurable. They may be standard features of the computer system represented by item 1, or they may simply be the only software package, mouse and keyboard that this particular seller offers with the selected computer system. However, items 2 and 5 are further configurable. Thus, there is a third level of the hierarchy having items 7 through 12. Specifically, items 7, 8 and 9 represent configurable features of the motherboard (item 2), and items 10, 111, and 12 represent configurable features of the monitor (item 5).

As with the items represented in the second level of the hierarchy, some items in the third level are further configurable by the user, and some items are not further configurable by the user. For example, items 7, 8, and 10 through 12 are not further configurable. Thus, the user only needs to make a selection with respect to that particular feature of the motherboard. For instance, item 7 can represent the central processing unit (CPU) of the motherboard. The user may choose from a number of available processors, such as Intel's™ Pentium™ line. Once a CPU type is chosen, there is no further configuration required with respect the CPU. Item 8 may represent the number of slots on the motherboard for adding additional cards. The user need only select a number of slots. In this example, items 10, 11 and 12 provide the only configurable features of the monitor (item 5). For example, item 10 may represent the color of the monitor (monochrome or color), item 11 may represent the size of the monitor, and item 12 may represent the frequency of the monitor. Once the user selects these features, the monitor will be fully configured.

On the other hand, item 9 is further configurable. Thus, there is a fourth level of the hierarchy having items 13 through 17. For the purpose of discussion, assume that item 9 represents the random access memory (RAM) of the computer system represented by item 1. Items 13 through 17 represent the configurable features of the RAM represented by item 9. For example, item 13 may represent the size of the RAM (e.g., 32 Mbytes or 512 Mbytes), item 14 may represent the type of the RAM (e.g., synchronous RAM or synchronous dynamic RAM), item 15 may represent the pin out of the RAM (e.g., single inline memory module or dual inline memory module), item 16 may represent the speed of the RAM (e.g., 800 Mbytes/sec or 1.5 Gbytes/sec), and item 17 may represent whether error checking and correction (ECC) is selected or not. Once the user has identified items 13 through 17, the RAM is fully configured.

The example provided by FIG. 5 is provided for the sake of discussion purposes, and is not intended to limit the present invention. Numerous configuration BOM structures can be implemented in accordance with the teachings described herein. Other configuration BOM structures may have fewer levels in the hierarchy (e.g., only one), or any number of levels (e.g., hundreds). The size and shape of the structure, as well as its content, is dependent, for example, on the product being configured and the various features available.

Figure 6:
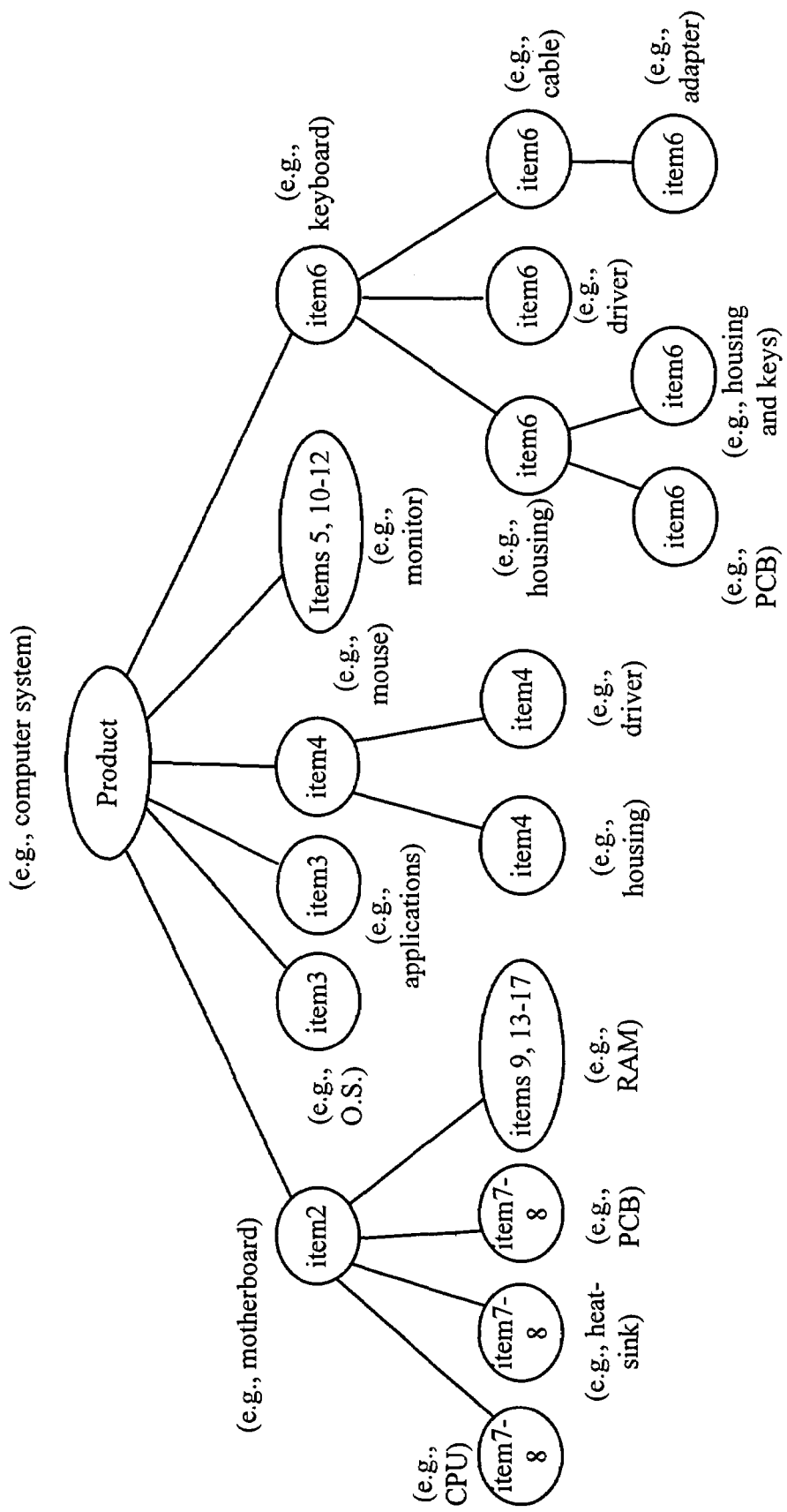
FIG. 6 represents a manufacturing BOM in accordance with one embodiment of the present invention.

FIG. 6 represents a manufacturing BOM in accordance with one embodiment of the present invention. As stated earlier, the manufacturing BOM is derived from the configuration BOM. One difference between the two BOM's is that the manufacturing BOM may have a greater level of detail that is not found in the configuration BOM. Generally, this is because a feature selected by the user can typically trigger several actions on the part of the manufacturer. For example, while the user may only select one feature, that feature may be comprised of several components and subassemblies that must be manufactured into the selected feature. Any one of these components or subassemblies may require the ordering of parts, and can potentially be the source of a late availability date. Thus, not only is it important to know the availability date of the overall feature, but also it is important to know the availability date of each component or subassembly that comprise the overall feature. Such information is particularly useful when a user is trying to find the cause of a late delivery date. Once this is known, a different feature may be selected that does not include the gating item.

The overall product represented in the first level of the manufacturing BOM maps to item 1 of the configuration BOM. For the sake of discussion and continuity, the computer system example used in reference to FIG. 5 will be used during the discussion of FIG. 6. Thus, assume the product of the manufacturing BOM is a computer system. The computer system indicated in the first level is further defined by the second and third levels of the hierarchy. The availability date that is associated with the computer system is defined by the delivery date of the item having the latest availability date. This date is referred to as the overall availability date of the computer system. Items 2 through 6 and 10 through 12 represent the second level of the hierarchy, and map from items 2 through 6 and 10 through 12, respectively, of the configuration BOM. Each of these mappings will now be discussed in more detail.

Item 2 of the manufacturing BOM maps from item 2 of the configuration BOM. As such, item 2 of the manufacturing BOM represents the motherboard of the computer system. For the sake of example, assume that the user can choose from three motherboards. The first has 4 slots and slow processor, the second has 6 slots and a medium processor, and the third has 8 slots and a fast processor. Also, assume that the motherboard is not further configurable as shown in FIGS. 5 and 6. This would be an example of a one-to-one mapping between the manufacturing BOM and the configuration BOM in that the item selected by the user corresponds directly to an item that the manufacturer has in stock or can order in its entirety. However, as shown in FIGS. 5 and 6 for the purpose of facilitating discussion, the motherboard is further configurable with items 7 through 9 and 13 through 17. As such, the availability date associated with the motherboard is dependent on the availability of these items.

Two items of the manufacturing BOM, each identified as item 3, map from item 3 of the configuration BOM. Item 3 of the configuration BOM represents the software package. However, in the manufacturing BOM, the software package is further defined as two separate items. For example, the first item 3 can represent the operating system software (e.g., Microsoft Windows™), and the second item 3 can represent the applications software (e.g., Microsoft Office™). This is an example of a one-to-many mapping in that the one item selected by the user corresponds to two or more items that the manufacturer has to provide in order to satisfy that selection. Each software item is also associated with its own availability date independent of the other software item. For example, the operating system software might be available immediately, while the applications software might not be available for several weeks because of a licensing problem. In such a situation, the applications software is the cause of a later availability date. The item 3 of the manufacturing BOM that corresponds to the applications software will reflect this availability date, while the item 3 of the manufacturing BOM that corresponds to the operating system software will reflect an immediate availability date.

Two items of the manufacturing BOM, each identified as item 4, map from item 4 of the configuration BOM. Item 4 of the configuration BOM represents the mouse of the computer system. However, in the manufacturing BOM, the mouse is further defined as an assembly comprising two different materials. For example, the top item 4 (shown in FIG. 6) can represent the overall mouse assembly. The lower left item 4 can represent the actual mouse housing, roller ball and cable. The lower right item 4 can represent the mouse software driver. This mapping is another example of a one-to-many mapping in that the one item selected by the user corresponds to two or more items that the manufacturer has to provide in order to satisfy that selection. In this case, the two or more items that are provided by the manufacturer are actually a single assembly that is comprised of two sub-components. Each of the sub-components is associated with its own availability date independent of the other sub-component, and each item 4 associated with those sub-components will reflect their corresponding availability dates. The later availability date of the two sub-components will be the availability date of the item 4 associated with the overall mouse assembly.

Items 5 and 10 through 12 of the manufacturing BOM are represented as a single item. This single item maps from items 5 and 10 through 12 of the configuration BOM. Items 5 and 10 through 12 of the configuration BOM represent the monitor of the computer system along with its configurable features. However, in the manufacturing BOM, the monitor is represented as a single assembly defined by items 5 and 10 through 12. This is an example of a many-to-one mapping in that the many items selected or specified by the user correspond to one item that the manufacturer has to provide in order to satisfy those selections. In this case, the size, color and the frequency of the monitor (items 10, 11 and 12, respectively) represent the configurable features of the monitor selected by the user. In this example, although the manufacturer may have several types of monitors, there is only one that satisfies the user's specified features. This single item (e.g., the monitor) represented by items 5 and 10 through 12 of the manufacturing BOM is associated with its own availability date. For example, if the manufacturer has the specified monitor in stock, the availability is immediate. However, if the manufacturer has to order the monitor from a vendor, the availability date is contingent upon the vendor's ability to deliver.

Seven items of the manufacturing BOM, each identified as item 6, map from item 6 of the configuration BOM. Item 6 of the configuration BOM represents the keyboard of the computer system. However, in the manufacturing BOM, the keyboard is further defined as an assembly comprising six different materials. For example, the top item 6 (shown in FIG. 6) can represent the overall keyboard assembly. The left item 6 of the middle row can represent the keyboard housing assembly. The left and middle items of the bottom row further define this housing assembly. For example, the left item of the bottom row can represent the printed circuit board, while the middle item of the bottom row can represent the actual housing and keys. The middle item 6 of the middle row can represent the keyboard software driver. The right item 6 of the middle row can represent the cable of the keyboard, and is further defined by the right item of the bottom row, which can represent an alternative adapter for use with the cable. This mapping is another example of a one-to-many mapping in that the one item selected by the user corresponds to two or more items that the manufacturer has to provide in order to satisfy that selection. As already explained, each of the items in the manufacturing BOM is associated with an availability date. In the case of the item 6 representing the housing assembly, each of the sub-components (e.g., the printed circuit board, and the housing with keys) has an availability date independent of the other. The later availability date of these two sub-components is the availability date of the overall housing assembly. Similarly, the item 6 representing the cable may be associated with the availability date of the item 6 representing the adapter if that adapter has an availability date later than that of the cable. The item 6 representing the software driver also has an availability date.

Items 7 through 9 and 13 through 17 represent the third level of the hierarchy, and map from items 7 through 9 and 13 through 17, respectively, of the configuration BOM. Specifically, three items of the manufacturing BOM, each identified as item 7-8, map from item 7 and item 8 of the configuration BOM. This is an example of a many-to-many mapping in that two or more items selected by the user correspond to two or more items that the manufacturer has to provide in order to satisfy those selections. Items 7 and 8 of the configuration BOM represent the CPU and the number of slots on the motherboard, respectively. However, in the manufacturing BOM, these user selections are further defined as three separate items. The leftmost item 7-8 can represent the CPU. The middle item 7-8 can represent the heat-sink that corresponds to the selected CPU. The rightmost item 7-8 can represent the actual printed circuit board that the CPU is coupled with to form the motherboard.

Items 9 and 13 through 17 of the manufacturing BOM are represented as a single item. This single item maps from items 9 and 13 through 17 of the configuration BOM. Items 9 and 13 through 17 of the configuration BOM represent the RAM of the motherboard along with its configurable features. However, in the manufacturing BOM, the RAM is represented as a single assembly defined by items 9 and 13 through 17. This is another example of a many-to-one mapping in that the many items selected or specified by the user correspond to one item that the manufacturer has to provide in order to satisfy those selections. In this case, the size, type, pin-out, speed and error checking/correction of the RAM (items 13, 14, 15, 16 and 17, respectively) represent the configurable features of the RAM selected by the user. In this example, although the manufacturer may have several types of RAM available, there is only one that satisfies the user's specified features. This single item (e.g., the user defined RAM) represented by items 9 and 13 through 17 of the manufacturing BOM is associated with its own availability date. For example, if the manufacturer has the specified RAM in stock, the availability is immediate. However, if the manufacturer has to order the RAM from a vendor, the availability date is contingent upon the vendor's ability to deliver.

The example provided by FIG. 6 is provided for the sake of discussion purposes, and is not intended to limit the present invention. The sub-assemblies and raw materials that comprise the selected features of the configurable product vary significantly depending on the manufacturer, as well as the status of such assemblies and materials (e.g., inventory items as opposed to vendor supplied items). Numerous manufacturing BOM structures can be implemented in accordance with the teachings described herein. Other manufacturing BOM structures may have fewer levels in the hierarchy (e.g., only one), or any number of levels (e.g., hundreds). The size and shape of the structure, as well as its content, is dependent, for example, on the manufacturer and the configuration BOM.

Figure 7:
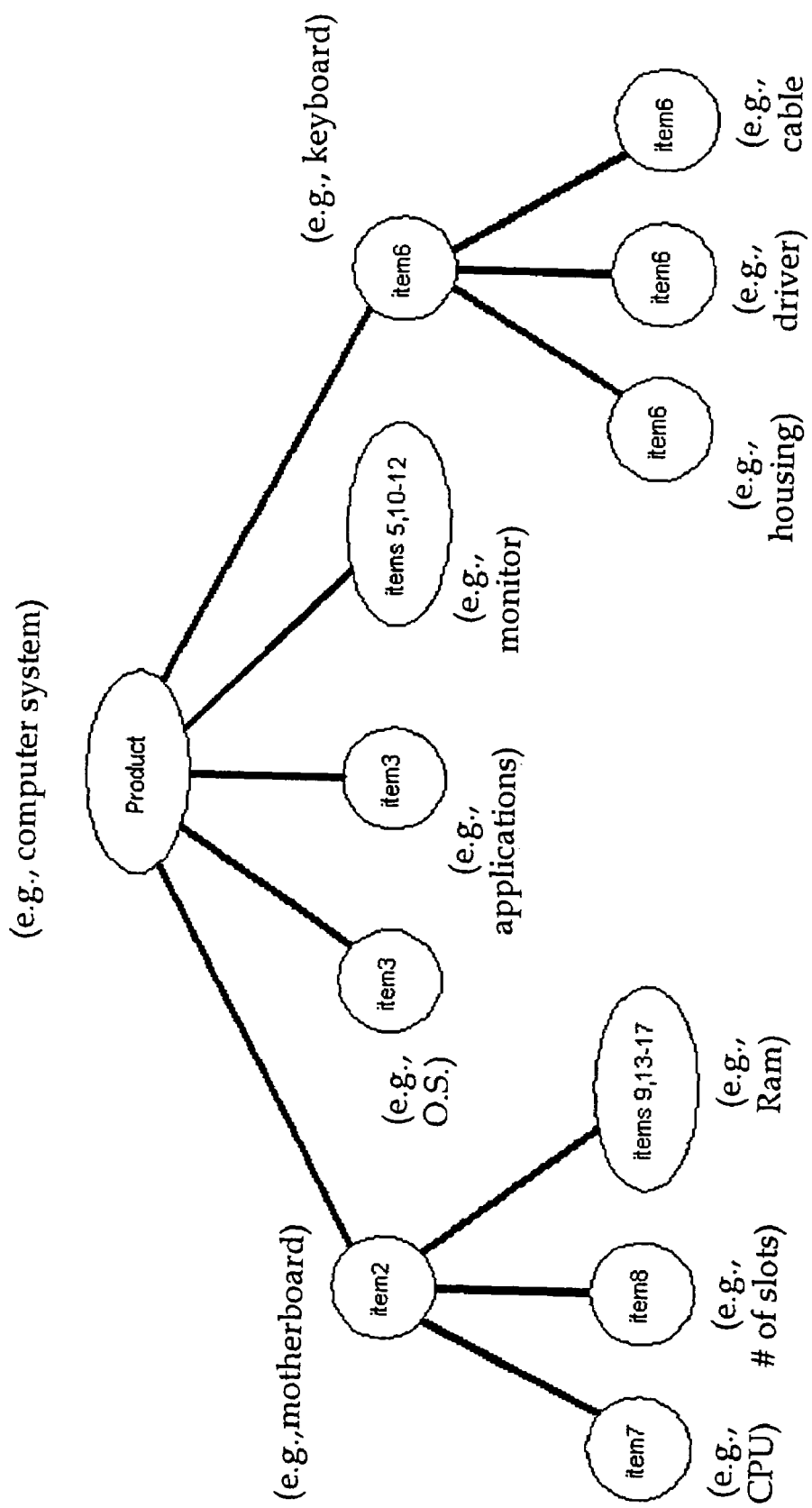
FIG. 7 represents a pricing BOM in accordance with one embodiment of the present invention.

FIG. 7 represents a pricing BOM in accordance with one embodiment of the present invention. The pricing BOM is updated with the pricing information received from supplier system 220 with respect to a selected product or feature. As previously stated, the pricing BOM can be derived from the configuration BOM, or from the manufacturing BOM. For example, the pricing BOM can be derived from the manufacturing BOM when pricing is determined by the supplier system. Alternatively, the pricing BOM can be derived from the configuration BOM when pricing is determined by the seller (i.e., on the configuration side).

The overall product represented in the first level of the pricing BOM can map to item 1 of the configuration BOM, or to item 1 of the manufacturing BOM. Continuing with the computer system example, the price that is associated with the computer system can, for instance, be defined by an aggregate of the prices of items comprising the system. This price is referred to as the overall price of the computer system. Items 2 through 6 and 10 through 12 represent the second level of the pricing BOM hierarchy. These items map to items 2 through 6 and 10 through 12, respectively, of the configuration BOM. Alternatively, these items map to items 2 through 6 and 10 through 12, respectively, of the manufacturing BOM. Each of these mappings will be discussed in turn.

For discussion purposes, the embodiment where the pricing BOM is converted from the configuration BOM is referred to as a first embodiment, and the embodiment where the pricing BOM is converted from the manufacturing BOM is referred to as a second embodiment. In the first embodiment, item 2 of the pricing BOM maps from item 2 of the configuration BOM. In a second embodiment, item 2 of the pricing BOM maps from item 2 of the manufacturing BOM. Item 2 of the pricing BOM (either the first or second embodiments) represents the motherboard of the computer system. This is one-to-one mapping as earlier explained. The overall price of the motherboard is associated with item 2 of the pricing BOM. This overall price can be, for example, dependent on the individual prices associated with the items that comprise the motherboard.

With regards to the first embodiment, two items of the pricing BOM, each identified as item 3, map from item 3 of the configuration BOM. Item 3 of the configuration BOM represents the software package. However, in the pricing BOM, the software package is further defined as two separate items. For example, the first item 3 can represent the operating system software (e.g., Microsoft Windows™), and the second item 3 can represent the applications software (e.g., Microsoft Office™). This is one-to-many mapping as previously explained. Each software item is associated with its own price independent of the other software item. For example, the operating system software might have a nominal price of $10, but the applications software might have a price of $200. Thus, in this embodiment, the total price for the software package represented by the item 3's in the pricing BOM is $210.

With regards to the second embodiment, the two item 3's of the pricing BOM map from the two item 3's, respectively, of the manufacturing BOM. Thus, in this embodiment, there is one-to-one mapping between the item 3's of the pricing BOM and the manufacturing BOM. Each software item is associated with its own price independent of the other software item as explained above. Additionally, the price associated with one of the software items (or any other items for that matter) may reflect an availability date that was offered as an accommodation to the customer (e.g., the customer specifically requested that date). For example, although the normal price of the applications software is $200 with an availability date of 1 week, the price for applications software having an availability date of 12 hours might be $250.

In the examples shown, both the configuration BOM and the manufacturing BOM have at least one item 4 that represents the mouse of the computer system as already explained. However, the pricing BOM that is shown in FIG. 7 does not represent any item 4. This could be for a number of reasons. For example, the manufacturer or seller is offering the mouse with the computer system at no extra charge to the customer. Alternatively, the manufacturer or seller has built the price of the mouse into the price of the keyboard. Regardless, since there is no charge for the mouse, the pricing BOM does not need to represent item 4 (the mouse). This embodiment may be used for optimizing the use of scarce memory resources. On the other hand, the pricing BOM can represent an item 4 that is associated with a price of $0.

With regards to the first embodiment, items 5 and 10 through 12 of the pricing BOM are represented as a single item. This single item maps from items 5 and 10 through 12 of the configuration BOM. Items 5 and 10 through 12 of the configuration BOM represent the monitor of the computer system along with its configurable features. However, in the pricing BOM, the monitor is represented as a single assembly defined by items 5 and 10 through 12. This is many-to-one mapping as already explained. This single item (e.g., the monitor) represented by items 5 and 10 through 12 of the pricing BOM is associated with a price. For example, the manufacturer might specify that the monitor has a price of $450.

With regards to the second embodiment, a single item of the pricing BOM (that single item representing items 5 and 10 through 12) maps from a single item of the manufacturing BOM (that single item representing items 5 and 10 through 12). Thus, in this embodiment, there is one-to-one mapping between the single item representing items 5 and 10 through 12 of the pricing BOM, and the single item representing items 5 and 10 through 12 of the manufacturing BOM. The single item (e.g., the monitor) represented by items 5 and 10 through 12 of the pricing BOM is associated with a price. As stated above, the price can be dependent, for example, on the availability date provided by the supplier system (e.g., the earlier the availability date, the higher the price).

With regards to the first embodiment, four items of the pricing BOM, each identified as item 6, map from item 6 of the configuration BOM. As earlier explained with regards to this example, item 6 of the configuration BOM represents the keyboard of the computer system. However, in the pricing BOM, the keyboard is represented by four different price items. For example, the top item 6 can represent the price of the overall keyboard assembly. This price can take into account, for example, the aggregate price associated with the lower item 6's and the labor involved in assembling the keyboard. The lower left item 6 can represent the overall price of the keyboard housing assembly. The lower middle item 6 can represent the price of the keyboard software driver. The lower right item 6 can represent the overall price of the keyboard cable and alternative adapter. This is a one-to-many mapping as earlier discussed.

With regards to the second embodiment, the four item 6's of the pricing BOM map from the seven item 6's of the manufacturing BOM. Thus, in this embodiment, there is many-to-many mapping between the item 6's of the pricing BOM and the item 6's of the manufacturing BOM. Each item 6 of the pricing BOM is associated with a price. For example, the lower left item 6 of the pricing BOM can represent the overall price of the keyboard housing assembly including the price of the printed circuit board, the actual housing and the keys. The lower middle item 6 of the pricing BOM can represent the price of the software driver for the keyboard. The lower right item 6 of the pricing BOM can represent the overall price of the keyboard cable including the price of the alternative adapter.

With regards to the first embodiment, items 7 and 8 of the pricing BOM map from items 7 and 8, respectively, of the configuration BOM. Item 7 of the configuration BOM represents the CPU of the motherboard, while item 8 represents the number of slots in the motherboard. These items map on a one-to-one basis to the pricing BOM. On the other hand, items 9 and 13 through 17 of the pricing BOM are represented as a single item. This single item maps from the separate items 9 and 13 through 17 of the configuration BOM, and represent the RAM. This is many-to-one mapping. The single item (e.g., the RAM) represented by items 9 and 13 through 17 of the pricing BOM is associated with a price. For example, the manufacturer might specify that the selected RAM has a price of $450.

With regards to the second embodiment, the items 7 and 8 of the pricing BOM map from the three items each identified as 7-8 of the manufacturing BOM. Thus, in this embodiment, there are many-to-many mappings between these items of the pricing BOM and the manufacturing BOM. Items 7-8 of the manufacturing BOM represent the CPU, the heat-sink and the printed circuit board along with their respective availability dates. The corresponding items of the pricing BOM that these items are mapped to are item 7 (e.g., the CPU) and item 8 (e.g., the number of slots in the mother board). These items 7 and 8 of the pricing BOM define, in part, the overall price of the motherboard represented by item 2. Each item 7 and 8 is associated with a price. For example, the selected CPU might have a price of $500, but the selected number of slots in the mother board has an associated price of $100 for a motherboard with up to four slots, and an extra $20 for every slot over four.

With regards to the second embodiment, a single item of the pricing BOM (that single item representing items 9 and 13 through 17) maps from a single item of the manufacturing BOM (that single item representing items 9 and 13 through 17). Thus, in this embodiment, there is one-to-one mapping between the single item representing items 9 and 13 through 17 of the pricing BOM, and the single item representing items 9 and 13 through 17 of the manufacturing BOM. The single item (e.g., the selected RAM) represented by items 9 and 13 through 17 of the pricing BOM is associated with a price.

The example provided by FIG. 7 is provided for the sake of discussion purposes, and is not intended to limit the present invention. The prices of the sub-assemblies and raw materials that comprise the selected features of the configurable product vary significantly depending on the manufacturer, as well as numerous other factors (e.g., supply and the total number of similar orders received). Numerous pricing BOM structures can be implemented in accordance with the teachings described herein. Other pricing BOM structures may have fewer levels in the hierarchy (e.g., only one), or any number of levels (e.g., hundreds). The size and shape of the structure, as well as its content, is dependent on, for example, the manufacturer, the seller, the configuration BOM and or the manufacturing BOM.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for selling a configurable product incorporating at least one feature to be selected by a customer, wherein the method allows a customer to dynamically interact with a seller of the product and with a supplier of a feature of the product over a network during the configuration, the method comprising:
    (a) receiving a feature selection from the customer at a seller;
    (b) updating an inventory library based upon the received selection to reflect constraints imposed by the received feature selection, the constraints relating to a technical feature limitation, a price limitation or availability of the configurable product;
    (c) providing the received selection to a supplier system during the configuration of the product with the customer, wherein the supplier system is associated with a supplier of the selected feature, wherein the supplier is independent from the seller;
    (d) receiving real-time information from the supplier system comprising at least one of availability date and price for the selected feature, the information being received by the customer during the configuration;
    (e) wherein when an indication is received from the customer indicating the customer is not satisfied with the availability date or price, providing to the supplier system customer-specified price for the selected feature;
    (f) providing, to the customer, accommodation data from the supplier system, the accommodation data responsive to the customer-specified price for the selected feature, wherein the accommodation data includes a second availability date, wherein the second availability date received from the supplier system is in response to the customer-specified price provided to the supplier system;
    (g) updating at least one of a manufacturing bill of materials, a pricing bill of materials, and a configuration bill of materials based on the received selection;
    (h) deriving a manufacturing bill of materials from a configuration bill of materials; and
    (i) mapping each feature represented in the configuration bill of materials to a corresponding hierarchal position in the manufacturing bill of materials, wherein each mapping is capable of being any one of a set of a one-to-one, a many-to-one, a one-to-many, and a many-to-many mapping.

2. The method of claim 1, further comprising: repeating the steps of receiving a feature selection, providing to a supplier system the selected feature, receiving from the supplier system real-time information, and updating a number of times until the configuration is complete thereby yielding a completed bill of materials.

3. The method of claim 1, wherein the step of receiving from the supplier system real-time information is preceded by the step of communicating the selected feature to a vendor, wherein a manufacturer obtains materials from the vendor for the selected feature.

4. The method of claim 1, the method further comprising: in response to the received availability date being unsatisfactory to the customer, communicating a customer-specified availability date to at least one of a configuration engine or the supplier system.

5. The method of claim 1, wherein the second availability date received from the supplier system is in response to a customer-specified availability date communicated to at least one of a configuration engine or the supplier system.

6. The method of claim 1, further comprising: deriving, from an in-process bill of materials, an in-process manufacturing bill of materials that reflects the received availability date that corresponds to the selected feature.

7. The method of claim 1, wherein the real-time information includes both a received price and availability date that corresponds to the selected feature.

8. The method of claim 7, the method further comprising: in response to the received price being unsatisfactory to the customer, communicating a customer-specified price to at least one of a configuration engine or the supplier system.

9. The method of claim 7, wherein a second price received is in response to a customer-specified availability date communicated to at least one of a configuration engine or the supplier system.

10. The method of claim 7, wherein a second price received is in response to a customer-specified price communicated to at least one of a configuration engine or the supplier system.

11. The method of claim 1, wherein a relationship between the customer and the seller has a configuration side associated with the customer, and a resource planning side associated with the seller, and the customer-seller relationship is respectively one of a consumer-seller relationship, a seller-supplier relationship and a supplier-vendor relationship.

12. The method of claim 11, further comprising:
in response to the price of the selected feature being determined on the configuration side, deriving an in-process pricing bill of materials from the in-process bill of materials, wherein the in-process pricing bill of materials reflects the price of the selected feature; and
in response to the price of the selected feature being determined on the resource planning side, deriving the in-process pricing bill of materials from an in-process manufacturing bill of materials that is derived from the in-process bill of materials and reflects the received availability date of the selected feature.

13. The method of claim 1, wherein the pricing bill of materials is derived from the configuration bill of materials.

14. The method of claim 1, wherein the pricing bill of materials is derived from the manufacturing bill of materials.

15. The method of claim 1, wherein the step (g) of updating at least one of a manufacturing bill of materials, a pricing bill of materials, and a configuration bill of materials is based upon the accommodation data from the supplier system.

16. The method of claim 1, wherein the availability date received from the manufacturer system over the network is provided by an enterprise resource planning (ERP) system.

17. The method of claim 1, wherein the availability date received from the manufacturer system over the network is provided to or by a supply chain planning (SCP) system.

18. A system for configuring a product that is associated with a number of configurable features, wherein the system allows a customer to dynamically interact with a seller of the product and a supplier of one or more of the configurable features over a network during the configuration, the system comprising:
a configuration engine of a seller configured for receiving a selection of a feature of the product from a customer, the seller being a seller of the product to the customer;
an inventory library coupled to the configuration engine for providing the customer a number of the configurable features that can be selected to configure the product;
a communication module coupled to the configuration engine for communicating the selected feature from the seller to the supplier, and for receiving over the network an automated real-time response, including an availability date of the selected feature, from the supplier to the configuration engine, the supplier being a supplier of the selected feature to the seller and being independent from the seller, wherein the communicating and receiving occur during the configuration with the customer,
a user interface coupled to the configuration engine using the network, the user interface for providing the automated real-time response to the customer and for receiving a customer-specified price when the customer is not satisfied with the availability date of the selected feature;
a price communication module coupled to the configuration engine for providing a customer-specified price to the supplier;
wherein the configuration engine is configured to receive accommodation data from the supplier, the accommodation data responsive to the customer-specified price, wherein the accommodation data includes a second availability date that is in response to the customer-specified price provided to the supplier, wherein the user interface is configured to provide the accommodation data to the customer;
a first storage area coupled to one of the configuration engine and the communication module for storing an in-process bill of materials that reflects the selected feature; and
a manufacturing bill of materials module coupled to the communication module for deriving a manufacturing bill of materials from the in-process bill of materials, wherein each feature represented in the in-process bill of materials is mapped to a corresponding hierarchal position in the manufacturing bill of materials, wherein each mapping is capable of being any one of a set of a one-to-one, a many-to-one, a one-to-many, and a many-to-many mapping.

19. The system of claim 18, wherein after the customer has completed configuring the product, the in-process bill of materials represents a completed bill of materials.

20. The system of claim 19, wherein in response to the availability date being unsatisfactory to the customer, the communication module communicates a customer-specified availability date to the supplier.

21. The system of claim 19, wherein the automated real-time response is in response to a customer-specified availability date communicated to the supplier by the communication module.

22. The system of claim 19, wherein an in-process manufacturing bill of materials is derived from the in-process bill of materials, and reflects the availability date of the selected feature.

23. The system of claim 19, further comprising:
a second storage area coupled to one of the configuration engine and the communication module for storing an in-process manufacturing bill of materials that reflects the availability date of the selected feature; and
a third storage area coupled to one of the configuration engine and the communication module for storing an in-process pricing bill of materials that reflects a price of the selected feature.

24. The system of claim 18, wherein the communication module is also for communicating a price of the selected feature from the supplier to the configuration engine.

25. The system of claim 24, wherein the communication module comprises:

an availability date communication module for communicating the availability date of the selected feature from the supplier to the configuration engine; and a price communication module for communicating the price of the selected feature to the configuration engine.

26. The system of claim 18, wherein a relationship between the customer and the seller has a configuration side associated with the customer, and a resource planning side associated with the seller, and the customer-seller relationship is respectively one of a consumer-seller relationship, a seller-manufacturer relationship and a manufacturer-vendor relationship.

27. The system of claim 26, wherein:

in response to the price of the selected feature being determined on the configuration side, an in-process pricing bill of materials is derived from the in-process bill of materials, wherein the in-process pricing bill of materials reflects the price of the selected feature; and in response to the price of the selected feature being determined on the resource planning side, the in-process pricing bill of materials is derived from an in-process manufacturing bill of materials that is derived from the in-process bill of materials and reflects the received availability date of the selected feature.

28. The system of claim 18, further comprising:

a user interface coupled to the configuration engine for allowing the customer to interact with the system.

29. The system of claim 18, where in the configuration engine is configured for validating a number of constraints associated with the selected feature, the constraints relating to compatibility between the selected feature and other features of the product or availability of the product including the selected feature.

30. A computer program product, stored on a computer-readable medium, for configuring a product that is associated with a number of configurable features, wherein in response to the computer program product being executed by a processor, the processor performs the steps of:

receiving a selected product feature from a customer at a seller;

updating an inventory library based upon the received selection to reflect constraints imposed by the received feature selection, the constraints relating to a technical feature limitation, a price limitation or availability of the configurable product;

communicating over a network the selected feature to a supplier system during the configuration of the product with the customer, wherein the supplier system is associated with a supplier of the selected feature, wherein the supplier is independent from the seller;

receiving from a supplier over the network an automated real-time response to the communicated selected feature including an availability date that corresponds to the product feature selected by the customer, the supplier being a supplier of the product feature to a seller and being independent from the seller, the customer being a customer of the seller, wherein the communicating and receiving is during a configuration of the product with the customer, wherein when an indication is received from the customer indicating the customer is not satisfied with the availability date or price, providing to the supplier system a customer-specified price for the selected feature;

providing, to the customer, accommodation data from the supplier system, the accommodation data responsive to the customer-specified price for the selected feature, wherein the accommodation data includes a second availability date, wherein the second availability date received from the supplier system is in response to the customer-specified price provided to the supplier system, wherein the customer is allowed to dynamically interact with a seller of the product and with the supplier of the selected feature of the product over a network during the configuration;

updating at least one of a manufacturing bill of materials, a pricing bill of materials, and a configuration bill of materials based on the received selection;

deriving a manufacturing bill of materials from a configuration bill of materials; and mapping each feature represented in the configuration bill of materials to a corresponding hierarchal position in the manufacturing bill of materials, wherein each mapping is capable of being any one of a set of a one-to-one, a many-to-one, a one-to-many, and a many-to-many mapping.

31. The computer program product of claim 30, wherein the processor performs the additional steps of:

in response to the availability date being unsatisfactory to the customer, communicating over the network a customer-specified availability date to the supplier; and receiving from the supplier over the network an automated real-time response including an accommodation based on the customer specified availability date.

32. The computer program product of claim 31, further comprising:

updating a bill of materials to reflect the accommodation received from the supplier.

* * * * *